United States Patent Office 3,474,634
Patented Oct. 28, 1969

3,474,634
METHOD OF AND APPARATUS FOR SELECTIVE OPERATION OF A WORKING MEDIUM CATCHER IN EVACUATING APPARATUS
Marcel Kohler and Adalbert Frick, Balzers, Liechtenstein, assignors to Balzers Patent- und Beteiligungs-Aktiengesellschaft, Balzers, Liechtenstein
Filed Mar. 14, 1968, Ser. No. 713,254
Claims priority, application Switzerland, Mar. 14, 1967, 3,785/67
Int. Cl. B01d 5/00
U.S. Cl. 62—55.5      7 Claims

ABSTRACT OF THE DISCLOSURE

A working medium catcher, interposed in a flow path between a space to be evacuated and a vacuum pump, includes a heat conductive body having a pair of independent flow circuits therein in heat exchange relation with each other. One flow circuit is supplied with water and the other with a very low temperature coolant such as liquid nitrogen. The heat exchange relation between the flow circuits is such that, when both coolants are supplied to the flow circuits, the water freezes and, when the supply of the low temperature coolant is interrupted, the water thaws, to maintain cooling of the catcher.

Background of the invention

In evacuating apparatus of the type including a vacuum pump connected to a space to be evacuated, it is known to provide a working medium catcher interposed in the flow path between the pump and the space to be evacuated. The function of this working medium catcher is to catch molecules of the working medium flowing back from the pump into the space to be evacuated, or to condense such molecules in order to prevent them from entering the space to be evacuated and wherein they would effect a deterioration of the attainable vacuum and thus interfere with sensitive vacuum processes. Customarily, the means used for this purpose comprises cooled baffle sheets extending diagonally across the flow path of the working medium molecules flowing back from the vacuum pump. The cooling is usually effected by means of coolant circulating pipes welded to the baffle sheets, or otherwise connected thereto in a heat conducting manner.

In order to adapt the arrangement to different operational conditions, it is known to use working medium baffles connected in series in the flow path of the working medium, between the pump and the space to be evacuated. In arrangements of this type, that baffle nearer the vacuum pump is cooled with water, while the baffle nearer the space to be evacuated is cooled by means of a low temperature coolant. This arrangement has the disadvantage that it greatly reduces the gas conductance of the connection between the space to be evacuated and the vacuum pump, and thus decreases the speed of evacuation.

Another proposal has been to supply a single working medium baffle selectively with water and with a low temperature coolant, such as liquid nitrogen. An arrangement of this type involves a great deal of complications and difficulties. Primarily, additional valves and safety devices are necessary in order to insure continuous cooling of the working medium baffle. This is necessary because if, for any reason, the supply of the low temperature coolant is interrupted, as when a supply thereof may become exhausted, water cooling must be automatically initiated in order to prevent working medium vapors and other easily condensable gases from entering the space to be evacuated. In vacuum arrangements which are to be operated automatically and without manual control, it is thus necessary to install expensive special equipment.

Summary of the invention

This invention relates to vacuum arrangements and, more particularly, to a novel method of and apparatus for selective operation of a working medium catcher interposed in a working medium flow path between the space to be evacuated and a vacuum pump.

The primary purpose of the present invention is to provide a working medium baffle, and a method for its operation, which have the advantage of safe operation with good gas conducting capacity and without the necessity of providing additional equipment. The invention is thus particularly important for automatically operating vacuum arrangements.

In accordance with the invention, there is disclosed a method for the selective operation of a working medium baffle or catcher for use with vacuum pumps, the baffle being of the type using water as one cooling agent and a coolant, such as a very low temperature coolant, as a second cooling agent. In accordance with the method, two cooling circulations are provided for the working medium baffle, these circulations being separated from each other with respect to the coolants but in heat transfer relation with each other. When one of the circuits is supplied with the low temperature coolant, the water supplied as a coolant to the other circuit freezes and automatically thaws to perform a cooling function as soon as the supply of the low temperature medium to its respective coolant circulation is interrupted either purposely or accidentally.

For performing the invention method, it is possible to use any baffle arrangement wherein two cooling circuits can be provided. However, it is preferred that the working medium catcher or baffle, to be selectively cooled with coolants of different temperatures, be constructed as a hollow body through which the coolants flow. This hollow body is connected to the baffle sheets, to be cooled, in a heat transferring relation.

The hollow body may comprise a block of a heat conductive metal, such as copper or aluminium, and this block is formed with two hollow spaces or flow circuits which are completely separate and independent of each other, have separate feeding and discharge pipes for respective coolants, but are connected in a heat exchange relation with each other.

The advantage of the invention method is that, during operation, it is possible to have the circulating means for the higher temperature coolant, such as water, turned on continuously during the time that the working medium catcher or baffle has the lower temperature cooling medium supplied thereto. However, in order to save cooling energy, it is advisable temporarily to interrupt the water circulation at the beginning of circulation of the low temperature coolant through the catcher or baffle and during freezing of the water. After freezing of the water, however, the water circulation is again activated so that, in the event of operational trouble resulting in failure of the flow circuit supplied with the low temperature coolant, or in the event of intentional interruption of the flow of the low temperature coolant, the frozen water thaws again and water cooling thus automatically starts, without requiring expensive control devices with temperature sensing means and automatically operated valves.

An object of the present invention is to provide an improved method for the selective cooling of a working medium catcher interposed in a working medium flow path between a space to be evacuated and a vacuum pump.

Another object of this invention is to provide such a method in which the catcher is cooled by circulation therein of two coolants, one of which remains fluid at a temperature below the solidification temperature of the other.

A further object of the invention is to provide such a method in which respective coolant flow circuits are provided in the catcher for each of the coolants, with the flow circuits being sealed from each other but in heat exchange relation with each other.

Yet, another object of the invention is to provide such a method involving the step of concurrently supplying each coolant to its respective flow circuit whereby the higher temperature coolant will solidify in its respective flow circuit when the lower temperature coolant is circulating in its respective flow circuit, the higher temperature coolant becoming fluid in its flow circuit upon interruption of the supply of the low temperature coolant to its respective flow circuit, to maintain cooling of the catcher.

A further object of the invention is to provide an improved working medium catcher or baffle for interposition in a working medium flow path between a space to be evacuated and a vacuum pump.

Still another object of the invention is to provide such a working medium catcher or baffle which is cooled by circulation therein of two coolants, one of which remains fluid at a temperature below the solidification temperature of the other.

A further object of the invention is to provide such a catcher or baffle comprising a hollow body of heat conductive material having separate flow passages formed therein in heat conducting relation with each other but physically separated and independent of each other, each flow passage or circuit being supplied with a respective different coolant.

Another object of the invention is to provide a working medium catcher or baffle in which, responsive to interruption of flow of a low temperature coolant therein, flow of a higher temperature coolant is made effective or initiated automatically and without the necessity of expensive control devices including temperature sensing means and automatically operated valves.

Brief description of the drawings

For an understanding of the principles of the invention, reference is made to the following description of a typical embodiment thereof as illustrated in the accompanying drawings.

In the drawings.

Description of the preferred embodiment

Figure 1:
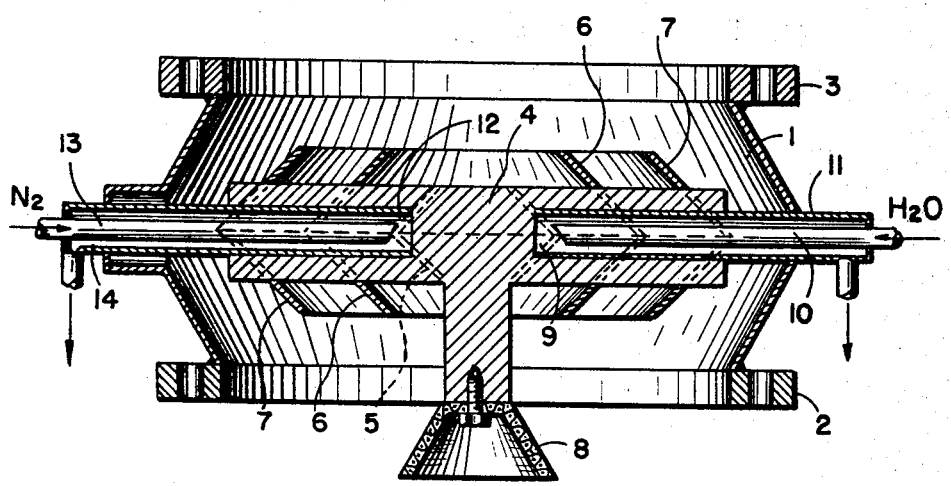
FIG. 1 is a diametric sectional view of a working medium catcher embodying the invention.
Figure 2:
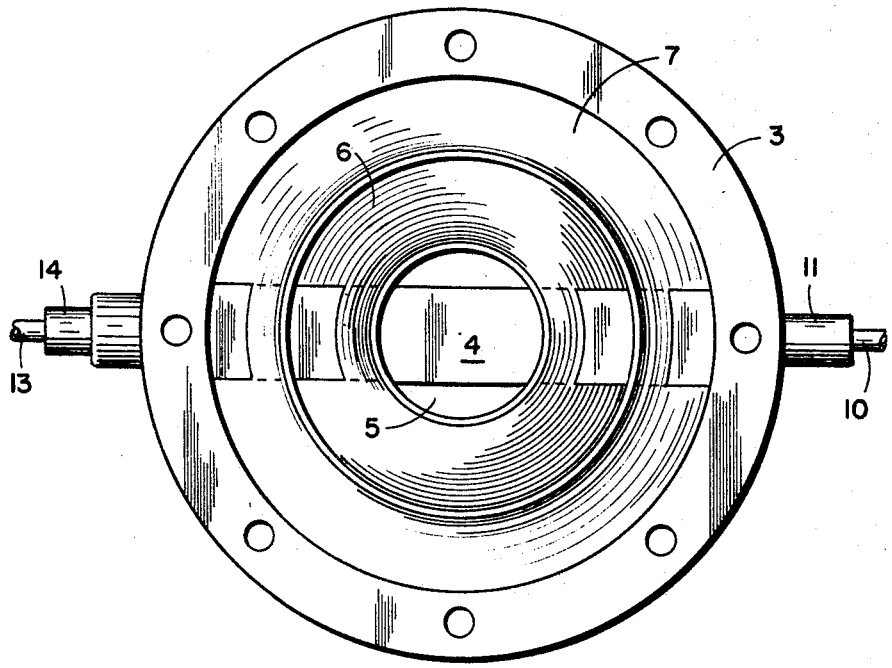
FIG. 2 is a plan view corresponding to FIG. 1.

Referring to the drawings, a housing 1 of a working medium catcher is connected to a working medium vacuum pump (not shown) by means of a flange 2, and a flange 3 is provided on housing 1 for connection of the catcher to the container or other space which is to be evacuated and which is to be protected against backflow of working medium vapors and the like. Within the housing 1, there is a cooling block 4 formed of a material of good heat conducting properties, for example, copper. Block 4 mounts, or has united thereto or integral therewith, a plurality of axially symmetrical frusto-conical baffle sheets 5, 6 and 7. These baffle sheets are arranged in such a manner that they permit passage of the gases to be evacuated but block a line of sight through the working medium catcher so that no molecule can pass through the catcher without impinging at least once upon a baffle sheet.

In addition, block 4 carries a screen 8 which, when the catcher is connected in the evacuating line, covers or extends over the tip of the nozzle of the vacuum pump in a known manner. The baffle sheets 5, 6 and 7 and the screen 8 are cooled by the block 4 by means of direct heat conduction therebetween.

In accordance with the invention, two completely separate coolant flow circuits are formed in block 4. The first of these circuits comprises the hollow space or cavity 9 which may be supplied with a relatively high temperature coolant, such as water, through inlet pipe 10, with the water being discharged through an outlet pipe 11, these two pipes extending through the wall of housing 1. The second coolant flow circuit is provided by the hollow space 12, and this space 12 may be supplied with a low temperature coolant such as, for example, liquid nitrogen. The nitrogen is supplied to space 12 through an inlet pipe 13 and discharged therefrom through an outlet pipe 14.

The heat exchange relation between the two coolant flow circuit spaces 9 and 12, in this arrangement, is such that, when liquid nitrogen is supplied to the space 12 and circulated therethrough, freezing of the water supplied to space 9 starts at the point designated by the lead line of reference numeral 9 and proceeds toward the exterior of block 4. Thereby it is insured that no isolated water trap is formed during the progressive freezing of the water in space 9. Such a water trap, when frozen per se, would burst block 4.

Another possibility of avoiding the danger of bursting of block 4 would be, of course, to provide the water coolant flow circuit with resilient walls which would give way upon expansion of the water during freezing. However, since such a construction would be substantially more complicated, it does not constitute a preferred embodiment of the invention. By contrast thereto, the working medium catcher of the invention as described in detail is easy and simple to manufacture, since cooling block 4 and baffle sheets 5, 6 and 7 may easily be cast in one piece, for example, also from light metal.

What is claimed is:

1. A method for the selective operation of a working medium catcher interposed in a working medium flow path between a space to be evacuated and a vacuum pump, and cooled by circulation therein of two coolants, one of which remains fluid at a temperature below the solidification temperature of the other, said method comprising the steps of providing respective coolant flow circuits in the catcher for each of said coolants, with the flow circuits being sealed from each other but in heat exchange relation with each other; and concurrently supplying each coolant to its respective flow circuit, while maintaining the heat exchange relation between the flow circuits such that said other coolant then will solidify in its respective flow circuit; said other coolant becoming fluid in its respective flow circuit upon interruption of the supply of said one coolant to its respective flow circuit, to maintain cooling of said catcher.

2. A working medium catcher for vacuum pumps, to be interposed in a working medium flow path between a space to be evacuated and a vacuum pump and to be selectively cooled with two coolants, one of which remains fluid at a temperature below the solidification temperature of the other, said working medium catcher comprising, in combination, baffle means constructed of heat conductive material and formed with respective coolant flow circuits therein for each of said coolants, said flow circuits being sealed from each other but being in heat exchange relation with each other; and means for concurrently supplying each of said coolants to a respective flow circuit, the heat exchange relation between said flow circuits being such that said other coolant then will solidify in its respective flow circuit and will become fluid in its flow circuit upon interruption of the supply of said one coolant to its respective flow circuit, to maintain cooling of said baffle means.

3. A method for the selective operation of a working medium catcher, as claimed in claim 1, wherein said other coolant is water and said one coolant remains fluid at a temperature below 0° C.

4. A method for the selective operation of a working medium catcher, as claimed in claim 3, wherein said one coolant is liquid nitrogen.

5. A working medium catcher, as claimed in claim 2, in which said baffle means comprises a hollow body of heat conductive material having said coolant flow circuits formed therein; and baffles of heat conductive material connected to said body in heat conducting relation therewith.

6. A working medium catcher, as claimed in claim 5, in which said baffle means further comprises a screen arranged to overlie a nozzle of a vacuum pump connected to said working medium catcher.

7. A working medium catcher, as claimed in claim 5, in which the heat exchange connection between said cooling circuits is constructed in such a manner that solidification of said other coolant will begin at the innermost point in the interior of its respective flow circuit and progress toward the outer end of its respective flow circuit.

References Cited

UNITED STATES PATENTS

| 3,168,819 | 2/1965 | Santeler | 62—55.5 |
| 3,321,927 | 5/1967 | Hood | 62—55.5 |

LLOYD L. KING, Primary Examiner